(12) United States Patent
Wood

(10) Patent No.: US 7,510,220 B1
(45) Date of Patent: Mar. 31, 2009

(54) METHOD AND HANDHELD DEVICE FOR TYING A FISHING KNOT

(76) Inventor: Franklin Wood, 151 Merrit Dr., Slocumb, AL (US) 36375

(*) Notice: Subject to any disclaimer, the term of this patent is extended or adjusted under 35 U.S.C. 154(b) by 0 days.

(21) Appl. No.: 11/940,584

(22) Filed: Nov. 15, 2007

(51) Int. Cl.
*D03J 3/00* (2006.01)

(52) U.S. Cl. ..................................................... 289/17

(58) Field of Classification Search ............... 289/17; D22/149
See application file for complete search history.

(56) References Cited

U.S. PATENT DOCUMENTS

| | | | | |
|---|---|---|---|---|
| 2,164,907 A | * | 7/1939 | Falkner | 43/53.5 |
| 2,843,961 A | * | 7/1958 | McKenzie | 289/17 |
| 3,630,555 A | * | 12/1971 | Newlin | 289/17 |
| D247,713 S | * | 4/1978 | Etes | D22/149 |
| 4,101,152 A | * | 7/1978 | Gardipee | 289/17 |
| 4,613,173 A | * | 9/1986 | Rosser | 289/17 |
| 5,098,137 A | * | 3/1992 | Wardall | 289/17 |
| 5,593,189 A | * | 1/1997 | Little | 289/17 |
| 5,611,578 A | * | 3/1997 | Angelico et al. | 289/17 |
| 5,647,616 A | * | 7/1997 | Hamilton | 289/17 |
| 5,829,798 A | * | 11/1998 | Little | 289/17 |
| 6,322,112 B1 | * | 11/2001 | Duncan | 289/1.5 |

* cited by examiner

*Primary Examiner*—Shaun R Hurley

(57) ABSTRACT

A handheld device is provided for aiding in attaching a fishing line to a fishing hook having an eye. The device includes a holder having a first end and a second end. At least one of the first end and the second end includes an opening through which the hook can be securely coupled. An end of the fishing line is inserted through the eye of the fishing hook to tie a fishing knot. The device can also include a fishing lure extending from at least one of the first end and the second end. The opening can be one of a slit, a groove, a slot, a hole, and a notch.

12 Claims, 3 Drawing Sheets

METHOD AND HANDHELD DEVICE FOR TYING A FISHING KNOT

FIELD OF THE INVENTION

This invention relates to a device and method of tying a fishing knot. More specifically, this invention relates to a stabilizer or handheld device for aiding in attaching a fishing line to a fishing hook having an eye.

BACKGROUND OF THE INVENTION

Fishing is an ancient and worldwide practice with various techniques and traditions. The practice of catching or attempting to catch fish with a hook is known as angling. The hook is usually attached by a line to a fishing rod and can be dressed with lures or bait.

Several steps are necessary to manually tie a hook onto a fishing line. The end of the fishing line is inserted through the eye of the hook. Next, the end of the line is wrapped around a line going back to the reel ("reel line") several times, forming twists. The end of the line is passed through a loop that exists between the eye of the hook and the twists. The end of the line is passed through a second loop that was created in the previous step. Then, a knot is formed by pulling the end of the line; the knot is slid down to the eye, and tightened by pulling the reel line. The end of the line is trimmed, resulting in a knot (or uni-knot).

Given the above description of manually tying a knot, it will be widely appreciated that tying a knot is a challenging undertaking, particularly for senior citizens having reduced visual acuity and dexterity, or for those having sustained significant hand injuries. In addition, fishermen fishing in the dark, in poor light conditions, or in cold weather, will have more difficulty hooking a line, with its many twists and loops.

It would therefore be advantageous if there were a handheld device for aiding in attaching a fishing line to a fishing hook.

SUMMARY OF THE INVENTION

The present invention is directed to a method of and device for improving ease of threading a fishing line on an eye of a fishing hook. In one embodiment of the present invention, a handheld device for aiding in attaching a fishing line to a fishing hook having an eye is disclosed. The device comprises a holder having a first end and a second end. At least one of the first end and the second end includes an opening through which the hook can be securely coupled. An end of the fishing line is inserted through the eye of the hook to tie a fishing knot.

Once the end of the fishing line is inserted through the eye of the hook, a fishing knot is tied by simply rolling the handheld device along a portion of the body, such as the upper leg, while, for example, holding the device with one hand and the fishing line with the other. As an example of this, after securing the fishing hook in the opening and inserting the end of the fishing line through the eye of the hook, the fishing line can be held in the left hand while holding the device in the right hand. The device is twisted to form several loops. The end of the fishing line is inserted back through the loop. Then, the fishing line (the line going back to the fishing reel) and the end of the fishing line are pulled down to the eye to form a knot. Any excess material can be trimmed off.

The device can further include a fishing lure which extends from at least one of the first end and the second end. The lure can include a slot for allowing access of an eye of the lure.

In accordance with an embodiment of the present invention, a material of the holder can be one of wood, metal, plastic and various combinations thereof. The holder can be a rod, a stick, a spindle, a tube, or any device that acts as a stabilizer for improving ease of threading a fishing line through an eye of a fishing hook. The opening in at least one of the first end and the second end can be a slit, a groove, a slot, a hole, or a notch.

In one embodiment of the present invention, the eye of the hook is coated with a fluorescent material. In another embodiment of the present invention, the eye of the hook is elongated for ease of inserting the end of the line through the eye.

In accordance with another embodiment of the present invention, a method of attaching a fishing line to a fishing hook having an eye is disclosed. The method comprises providing a holder having a first end and a second end, wherein at least one of the first end and the second end includes an opening through which the hook can be securely coupled. The method also comprises inserting an end of the line through the eye of the hook to tie a fishing knot. The method can further comprise extending a fishing lure from at least one of the first end and the second end. The method can also comprise coating the eye of the hook with a fluorescent material. The method can also comprise elongating the eye of the hook for ease of inserting the end of the line through the eye.

DETAILED DESCRIPTION OF THE PREFERRED EMBODIMENTS

Figure 1A:
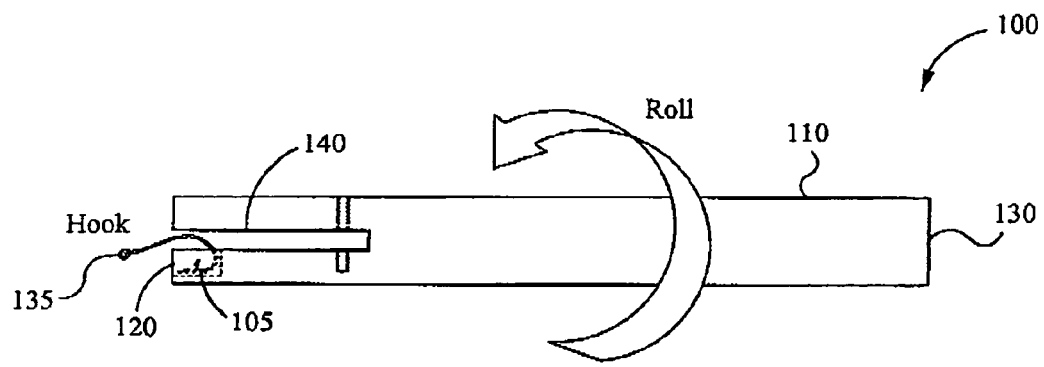
FIG. 1A shows a handheld device for aiding in attaching a fishing line to a fishing hook, in accordance with one embodiment of the present invention.

The present invention is directed to a method and handheld device (or stabilizer) for aiding in attaching a fishing line to a fishing hook having an eye. FIG. 1A shows a handheld device 100 for aiding in attaching a fishing line to a fishing hook, in accordance with one embodiment of the present invention. The handheld device 100 includes a holder 110 having a first end 120 and a second end 130. In one embodiment, one of the first end 120 and the second end 130 includes an opening 140 through which a fishing hook 105 is securely coupled. In the FIG. 1A, the first end 120 includes the opening 140. An end of a fishing line (not shown) is inserted through an eye 135 of the fishing hook 105 to tie a fishing knot (now shown).

Once the end of the fishing line is inserted through the eye of the hook, a fishing knot is tied by simply rolling the handheld device along a portion of the body, such as the upper leg, while, for example, holding the device with one hand and the fishing line with the other. As an example of this, after securing the fishing hook in the opening and inserting the end of the fishing line through the eye of the hook, the fishing line can be held in the left hand while holding the device in the right hand. The device is twisted to form several loops. The end of the fishing line is inserted back through the loop. Then, the fishing line (the line going back to the fishing reel) and the end of the fishing line are pulled down to the eye to form a knot. Any excess material can be trimmed off.

In accordance with the present invention, the holder 110 can be made of wood, metal, plastic or various combinations thereof. The holder 110 can be one of a rod, a stick, a spindle, and a tube. The holder 110 can be any device for aiding in attaching a fishing line to a fishing hook. The opening 140 can be one of a slit, a stick, a spindle, a tube, or any space through which a fishing hook can be securely coupled.

In accordance with the present invention, the eye 135 of the hook 105 can be coated with a fluorescent material, so that users having reduced visual acuity and dexterity can more easily insert the end of the line through the eye 135. Similarly, the eye 135 of the hook 105 can be elongated for ease of inserting the end of the line through the eye 135.

Figure 1B:
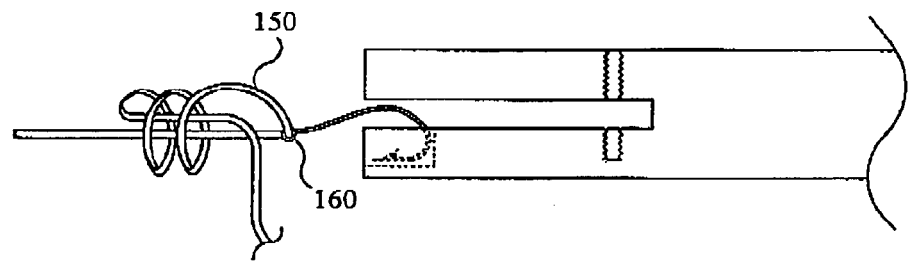
FIG. 1B shows a handheld device for aiding in attaching a fishing line to a fishing hook, including an end of a fishing line inserted through the eye of the hook, in accordance with one embodiment of the present invention.

FIG. 1B shows a handheld device for aiding in attaching a fishing line to a fishing hook, including an end of a fishing line inserted through the eye of the hook, in accordance with one embodiment of the present invention. In the FIG. 1B, a fishing line 150 is shown being inserted through an eye 160 (of a fishing hook) and then tied, as described above.

Figure 2A:
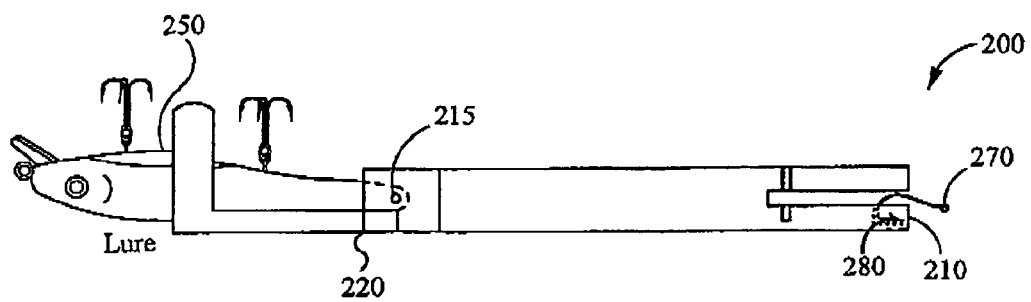
FIG. 2A shows a handheld device for aiding in attaching a fishing line to a fishing hook, including a fishing lure extending from one end of the device, in accordance with one embodiment of the present invention.
Figure 2B:
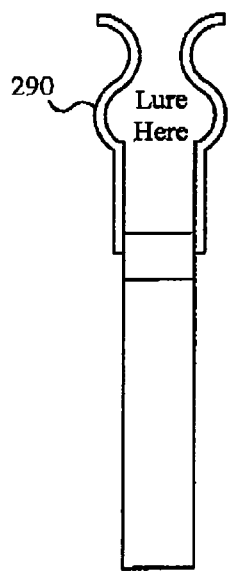
FIG. 2B shows an alternative view of the handheld device of FIG. 2A for coupling a lure on one end of the device, in accordance with one embodiment of the present invention.
Figure 2C:
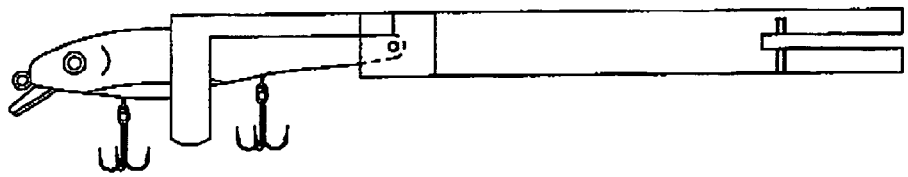
FIG. 2C shows an alternative view of the handheld device of FIG. 2A, including a fishing lure extending from one end of the device, in accordance with one embodiment of the present invention.

FIG. 2A shows a handheld device 200 for aiding in attaching a fishing line (not shown) to a fishing hook 280 having an eye 270, wherein the device 200 includes a fishing lure 250 extending from one of a first end 210 and a second end 220 of the device 200, in accordance with one embodiment of the present invention. In the FIG. 2A, the lure 250, which extends from the second end 220, can be held in place by an adjustable screw connection 215. As shown in FIG. 2B, the lure 250 can be stabilized via a spring or clip 290. The clip 290 can be made of steel, plastic or any device for stabilizing the fishing lure to the handheld device 200. The clip can also include a slot for allowing access of any eye of the lure. FIG. 2C shows an alternative view of the handheld device of FIG. 2A, including a fishing lure extending from one end of the device, in accordance with one embodiment of the present invention.

Figure 3:
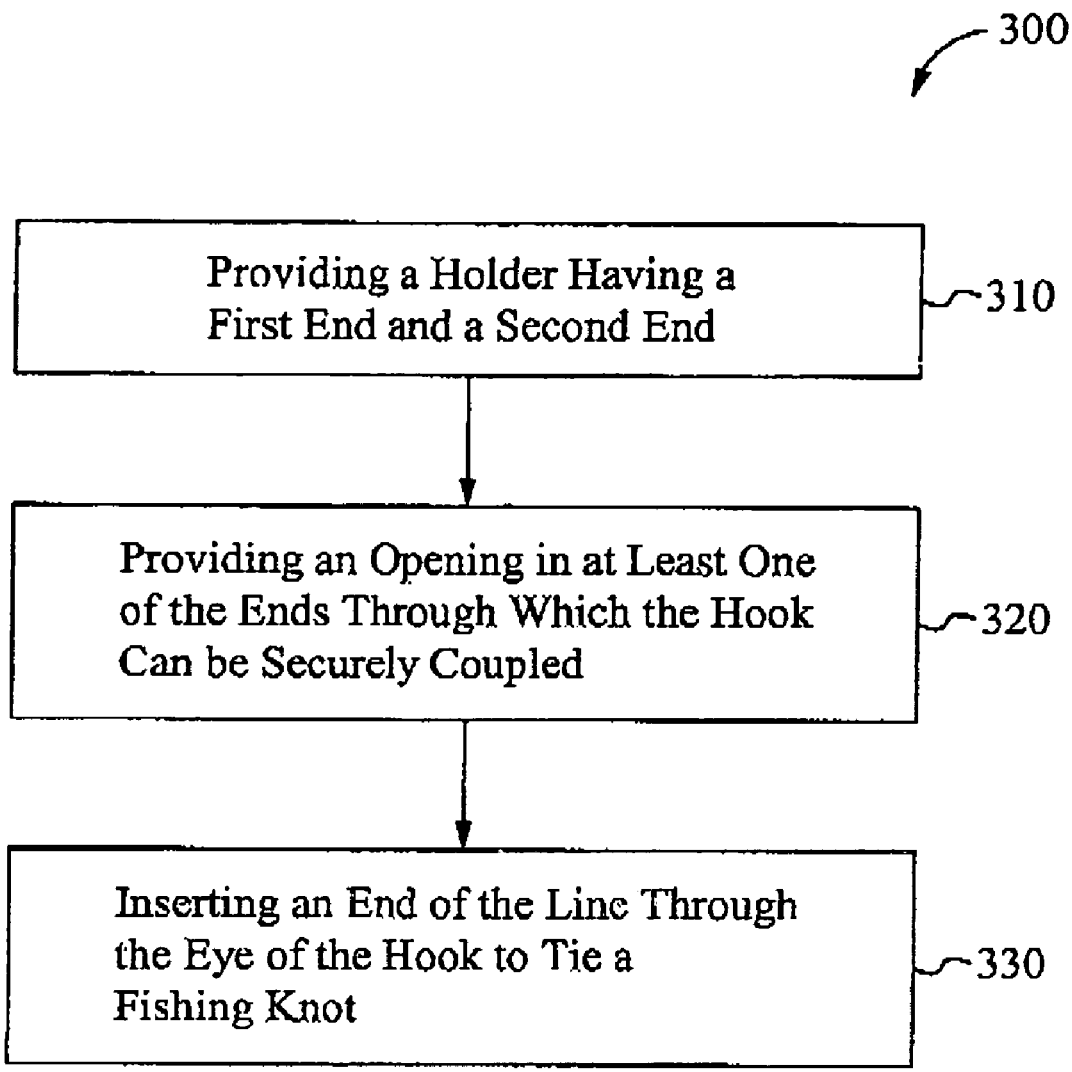
FIG. 3 shows a flow chart of a method of attaching a fishing line to a fishing hook having an eye, in accordance with one embodiment of the present invention.

FIG. 3 shows a flow chart of a method 300 of attaching a fishing line to a fishing hook having an eye, in accordance with one embodiment of the present invention. In the Step 310, a holder is provided having a first end and a second end. In the Step 320, an opening is provided in at least one of the ends through which the hook can be securely coupled. In the Step 330, an end of the fishing line is inserted through the eye of the hook to tie a fishing knot.

In accordance with one embodiment of the present invention, the method 300 can further comprise extending a fishing lure from at least one of the first end and the second end. The method 300 can also comprise coating the eye of the hook with a fluorescent material. The method 300 can also comprise elongating the eye of the hook for ease of inserting the end of the line through the eye.

The present invention has been described in terms of specific embodiments incorporating details to facilitate the understanding of principles of construction and operation of the invention. Such reference herein to specific embodiments and details thereof is not intended to limit the scope of the claims appended hereto. It will be apparent to those skilled in the art that modification may be made in the embodiments chosen for illustration without departing from the spirit and scope of the invention.

What is claimed is:

1. A handheld device for aiding in attaching a fishing line to a fishing hook having an eye, comprising: a holder having a first end and a second end, at least one of the first end and the second end including an opening through which the hook is securely coupled, wherein an end of the fishing line is inserted through the eye of the fishing hook to tie a fishing knot; and a clip, coupled to the device, for holding a fishing lure.

2. The device of claim 1 wherein a material of the holder is one of wood, metal, plastic, and various combinations thereof.

3. The device of claim 1 wherein the holder is one of a rod, a stick, a spindle, and a tube.

4. The device of claim 1 wherein the opening is one of a slit, a groove, a slot, a hole and a notch.

5. The device of claim 1 wherein the eye of the hook is coated with a fluorescent material.

6. The device of claim 1 wherein the eye of the hook is elongated for ease of inserting the end of the line through the eye.

7. A method of attaching a fishing line to a fishing hook having an eye, comprising:
   a. providing a holder having a first end and a second end;
   b. providing an opening in at least one of the ends through which the hook is securely coupled;
   c. inserting an end of the line through the eye of the hook to tie a fishing knot; and
   d. providing a clip, coupled to the device, for holding a fishing lure.

8. The method of claim 7 wherein a material of the holder is one of wood, metal, plastic, and various combinations thereof.

9. The method of claim 7 wherein the holder is one of a rod, a stick, a spindle, and a tube.

10. The method of claim 7 wherein the opening is one of a slit, a groove, a slot, a hole, and a notch.

11. The method of claim 7 further comprising coating the eye of the hook with a fluorescent material.

12. The method of claim 7 further comprising elongating the eye of the hook for ease of inserting the end of the line through the eye.

* * * * *